(12) United States Patent
Lee et al.

(10) Patent No.: US 10,338,566 B2
(45) Date of Patent: Jul. 2, 2019

(54) VARIABLE SLICING FOR 3D MODELING

(71) Applicant: KT CORPORATION, Seongnam-si, Gyeonggi-do (KR)

(72) Inventors: Zucheul Lee, Yongin-si (KR); Daehwan Kim, Yongin-si (KR); Yeong-il Seo, Seoul (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 327 days.

(21) Appl. No.: 14/964,916

(22) Filed: Dec. 10, 2015

(65) Prior Publication Data

US 2016/0176117 A1 Jun. 23, 2016

(30) Foreign Application Priority Data

Dec. 23, 2014 (KR) .......................... 10-2014-0187560

(51) Int. Cl.
*B29C 67/00* (2017.01)
*G05B 19/4099* (2006.01)
*B33Y 50/00* (2015.01)

(52) U.S. Cl.
CPC .......... *G05B 19/4099* (2013.01); *B33Y 50/00* (2014.12); *G05B 2219/35134* (2013.01); *G05B 2219/49007* (2013.01); *G05B 2219/49014* (2013.01)

(58) Field of Classification Search
USPC ........................................................ 700/98
See application file for complete search history.

(56) References Cited

U.S. PATENT DOCUMENTS

| 6,405,095 | B1 * | 6/2002 | Jang ................... | G05B 19/4099 264/308 |
| 6,678,571 | B1 * | 1/2004 | Manners ................ | B33Y 10/00 264/401 |
| 2015/0269289 | A1 * | 9/2015 | Kim .................... | G06F 17/5009 703/6 |

FOREIGN PATENT DOCUMENTS

KR   10-2014-0102240 A   8/2014

OTHER PUBLICATIONS

Qian et al., "Feature Based Fabrication in Layered Manufacturing" Journal of Mechanical Design, ASME vol. 123, Sep. 2001, pp. 337-345.*
Hayasi et al., "A new adaptive slicing approach for the fully dense freeform fabrication (FDFF) process." Journal of Intelligent Manufacturing, Aug. 2013, vol. 24, Issue 4, pp. 683-694. (Year: 2013).*
Jung Whan Park et al., "Development of Scaffold Fabrication System using Multi-axis RP Software Technique", Journal of Korea Society for Precision Engineering, vol. 29, No. 1, 33-40, Jan. 2012.

* cited by examiner

*Primary Examiner* — Emilio J Saavedra
(74) *Attorney, Agent, or Firm* — Hamre, Schumann, Muller & Larson, P.C.

(57) ABSTRACT

Varying a slicing thickness for 3D modeling may include: receiving 3D modeling data from a user device; slicing the 3D modeling data, in accordance with a first thickness, into multiple cross-sections; calculating a complexity of one or more of the multiple cross-sections; and determining a slicing thickness of the 3D modeling data based on the complexity of the one or more of the multiple cross-sections.

14 Claims, 8 Drawing Sheets

VARIABLE SLICING FOR 3D MODELING

BACKGROUND 3D printing is a technology for creating a three-dimensional objects based on three-dimensionally designed data by synthesizing various materials together. The 3D printing, called a third industrial revolution, is expected to change technological paradigms in numerous fields including manufacturing.

Methods of making three-dimensional objects are divided into an additive manufacturing method that manufactures a three-dimensional object by stacking a solid specific material, and a subtractive manufacturing method that cuts or sharpens a three-dimensional object through machine processing. The subtractive manufacturing method is performed by a 4- or 5-axis processor, and has been already commercialized and widely used in industrial fields.

Additive manufacturing methods include a fused deposition modeling (FDM) method by which a plastic material is melted and is sprayed out by a nozzle. This method is a relatively cheap 3D printing solution, and is believed to reduce consumption of materials relative to other 3D printing methods. Additive manufacturing methods also include a selective laser sintering (SLS) method by which a product is made by thinly spreading a powder material on a field and sintering only a selected part using a laser.

3-dimensional printing (3DP) includes thinly spreading a powder-like material, like the SLS method, but spraying an adhesive and allowing it to harden, instead of applying a laser.

3D printing is prefaced by processes that include: 3D modeling; standard tessellation language (STL) or additive manufacturing format (AMF) file conversion; G-code conversion; and real object printing using a host program.

3D modeling pertains to forming an object in a three-dimensional configuration using computer aided design (CAD) software, animation modeling software such as Maya and MAX, a 3D scanner, etc. The resulting 3D modeling data may be converted to an STL file that can be received and processed by a 3D printer. The conversion into the STL file is performed by common CAD software.

In this regard, Korean Patent Application Publication No. 2014-0102240 relates to network-connected 3-dimensional printing and describes providing an environment where a multiple number of 3D printers, a printing server and a multiple number of client devices are connected to one another through a network.

SUMMARY

In one example embodiment, a method of varying a slicing thickness for 3D modeling may include: receiving 3D modeling data from a user device; slicing the 3D modeling data, in accordance with a first thickness, into multiple cross-sections; calculating a complexity of one or more of the multiple cross-sections; and determining a slicing thickness of the 3D modeling data based on the complexity of the one or more of the multiple cross-sections.

In another example embodiment, a 3D modeling device may include: a receiver to receive 3D modeling data from a user device; a simulator to slice the 3D modeling data into multiple cross-sections; a calculator to calculate a complexity of one or more of the multiple cross-sections; and a model manager to determine a slicing thickness of the 3D modeling data based on the complexity of the sliced cross-sections.

In yet another example embodiment, a computing device may include: a memory; and a processing unit to: receive 3D modeling data from a user device; perform a virtual simulation to produce cross-sections of the 3D modeling data; calculate a complexity of the cross-sections produced by the virtual simulation; and determine a thickness of the 3D modeling data based on the complexity of the cross-sections.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
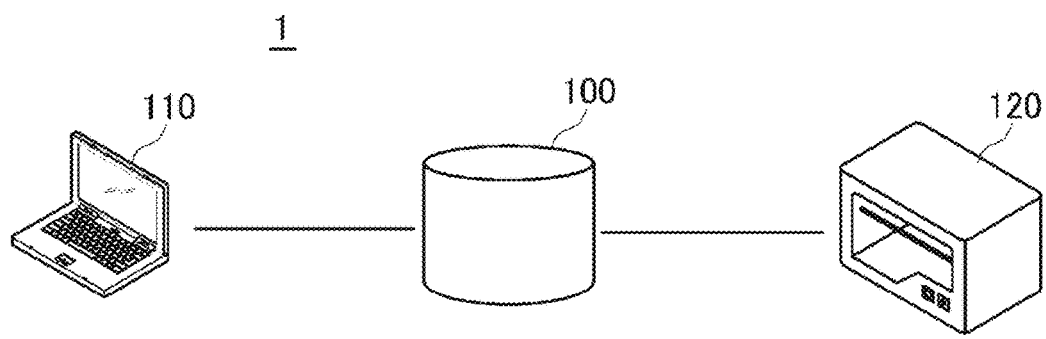
FIG. 1 is a depiction of a system to implement variable slicing, in accordance with example embodiments of 3D modeling, as described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

The example embodiments described herein pertain to methods, programs, applications, systems, and apparatuses for variable slicing for 3D modeling.

In accordance with the example embodiments, it is possible to provide a method, a slicer and a computing device for carrying out virtual simulation to slice a 3D shape of 3D modeling data with a preset thickness and determining complexity of each slicing cross section produced according to the virtual simulation result.

Also, it is possible to provide a method, a slicer and a computing device for adaptively changing a slice thickness based on the complexity of each slicing cross section.

By carrying out the slicing while adaptively changing the slice thickness based on the complexity of the slicing cross section, it is possible to maintain the same quality as that in case of slicing with a uniform thickness, and at the same time, reduce output time of a 3D printer.

By carrying out the slicing and the outputting while changing the slice thickness, effective stacking is possible, and thereby, life time of a 3D printer can be increased.

FIG. 1 is a depiction of a system to implement variable slicing, in accordance with example embodiments of 3D modeling, as described herein. Referring to FIG. 1, a variable slicing system 1 may include a variable slicer 100, a user terminal 110 and a 3D printer 120.

As referenced herein, slicing of 3D modeling data may refer to translating 3D modeling data into individual layers, in the aforementioned 3D shape, to be used as machine code for subsequent printing.

Further, as referenced herein, a virtual simulation may be performed by virtual simulation software adopting a multiple number of simulators for a 3D printing recommendation in a cloud environment. The simulators may virtually slice across 3D modeling data in various slicing directions using a 3D printer selected by user terminal 100 to produce multiple cross-sections of the 3D modeling data. Thus, virtual simulation software may provide multiple slicing outputs pertaining to respective slicing directions.

Further still, as referenced herein, G-code may refer to a numerical language, utilized by a program, application, or code to slice 3D modeling data that may be used to provide instructions to a 3D printer. The printing instructions may include height, width, and thickness parameters for each of the individual layers.

Variable slicer 100 may carry out virtual simulation to uniformly slice a 3D shape of 3D modeling data in accordance with a preset thickness.

Variable slicer 100 may determine a complexity of each sliced cross section by, e.g., counting the number of times that each sliced cross section crosses both vertexes of the 3D shape and lines connecting the vertexes. When the number of times that a sliced cross section crosses the lines and the vertexes is large, the variable slicer 100 may determine that complexity of the corresponding sliced cross section is high. When the number of times that a sliced cross section crosses the vertexes and/or the lines that connect the vertexes is small, the variable slicer 100 may determine that complexity of the corresponding sliced cross section is low.

As further part of determining a complexity for each sliced cross section, variable slicer 100 may apply different weights to the number of times that a sliced cross section crosses the lines that connect two or more of the vertexes and/or the number of times that the sliced cross section crosses the vertexes themselves. For example, the variable slicer 100 may determine that a sliced cross section that crosses the vertexes has a higher complexity than a sliced cross section that crosses the lines that connect two or more of the vertexes.

Variable slicer 100 may change a preset thickness of the virtual simulation based on the complexity of each sliced cross section. For example, when the determined complexity of each slicing cross section that output time and output quality can be improved by recalculating complexity of each sliced cross section by changing the preset thickness, the variable slicer 100 may change the preset thickness of the virtual simulation. In addition, variable slicer 100 may carry out or repeat the virtual simulation again with the changed thickness; that is, the first thickness, i.e., the preset thickness, is changed into a second thickness.

Variable slicer 100 may carry out the virtual simulation through a 3D polygon mesh model based on the 3D modeling data.

Variable slicer 100 may adaptively change a thickness for sliced cross sections based on a determined complexity of each sliced cross section. When a complexity of a sliced cross section is high, the variable slicer 100 may make a slice thickness of the corresponding sliced cross section thin, and when complexity of a sliced cross section is low, the variable slicer 100 may make a slice thickness of the corresponding sliced cross section thick.

Variable slicer 100 may again slice the 3D shape of the 3D modeling data based on the changed slice thickness. Also, the variable slicer 100 may produce a G-code according to the slicing and transmit the G-code to a 3D printer 120.

The 3D printer 120 may receive the G-code from the variable slicer 100. Also, the 3D printer 120 may carry out 3D printing corresponding to the G-code. The 3D printer 120 may change each sliced cross section based on the G-code to output the 3D modeling data.

Figure 2:
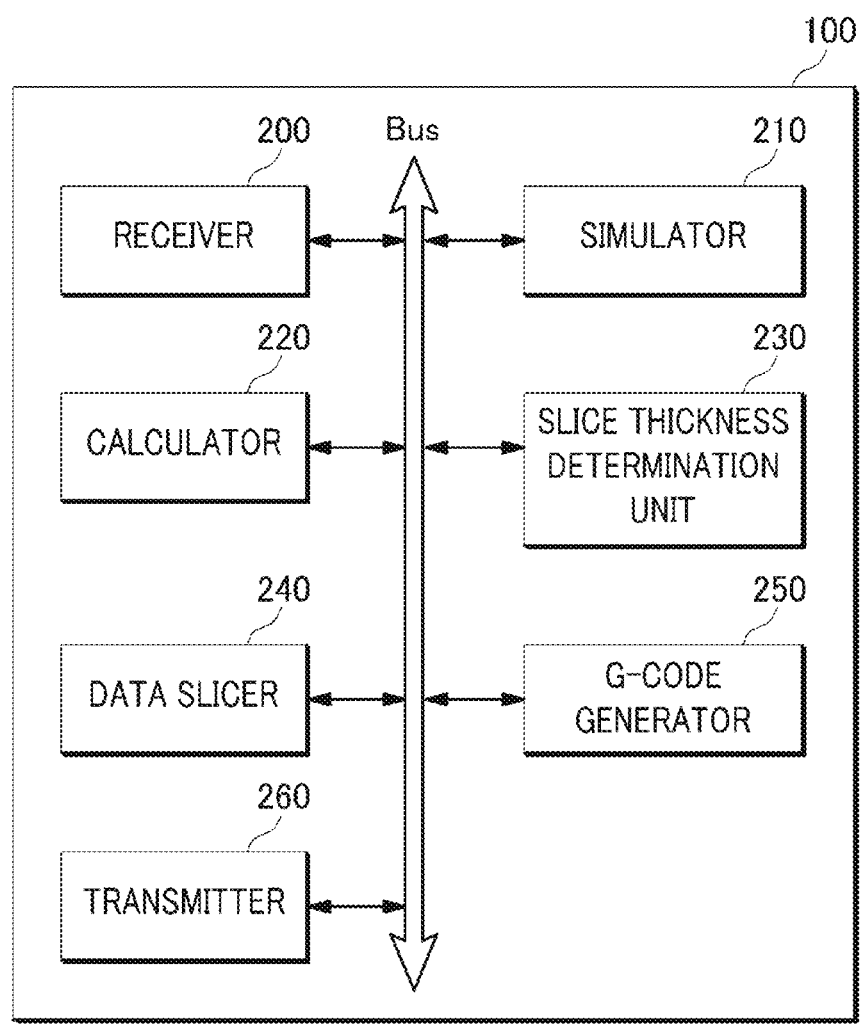
FIG. 2 is a block diagram of the variable slicer, in accordance with example embodiments of 3D modeling as described herein.

FIG. 2 is a block diagram of the variable slicer, in accordance with example embodiments of 3D modeling, as described herein. Referring to FIG. 2, the variable slicer 100 may include a receiver 200, a simulator 210, a calculator 220, a slice thickness determination unit 230, a data slicer 240, a G-code generator 250, and a transmitter 260. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. These components may be implemented in a computing environment relative to variable slicer 100, and may be stored in a corresponding memory storage device. For purposes of illustration, the application or program, including executable program components, are illustrated herein as discrete blocks, although it is recognized that such programs and components reside at various times in different storage components of the corresponding client device, and may be executed by at least one data processor of the computer.

Receiver 200 may be configured to receive 3D modeling data from the user terminal 110. For example, the 3D modeling data may be a stereo-lithography (STL) format or an additive manufacturing format (AMF). For example, user terminal 100 may produce 3D modeling data using various types of software that may be hosted, executed, and/or instantiated on user terminal 100 or on a corresponding cloud resource. In another example embodiment of variable slicing system 1 may store, host, and/or execute software to, upon execution, produce the 3D modeling data. User terminal 100 may transmit the produced 3D modeling data to the variable slicing system 1. The 3D modeling data may be produced in accordance with, e.g., standard tessellation language (STL), additive manufacturing format (AMF), etc.

Simulator 210 may be configured to carry out virtual simulation to slice a 3D shape of the 3D modeling data in accordance with a preset thickness. Simulator 210 may uniformly slice the 3D shape of the 3D modeling data with the preset thickness through virtual simulation. The simulation unit 120 may carry out the virtual simulation through a 3D polygon mesh model based on the 3D modeling data.

The calculator 220 may determine a complexity for each sliced cross section produced according to the virtual simulation result. For example, calculator 220 may count the number of times that each sliced cross section crosses vertexes of the 3D shape and/or crosses lines that connect at least two of the vertexes.

When the number of times that a sliced cross section crosses with the lines and the vertexes is large, calculator 220 may determine that complexity of the corresponding sliced cross section is high. When the number of times that a sliced cross section crosses with the lines and the vertexes is small, calculator 220 may determine that the corresponding sliced cross section is low. For example, calculator 220 may set threshold values including a first threshold value and a second threshold value and count the number of times that a sliced cross section crosses the lines and the vertexes. If that number of times is less than the first threshold value, calculator 220 may determine a complexity of the corresponding sliced cross section corresponds to a first level, e.g., low. If that counted number of times is between the first threshold value and the second threshold value, calculator 220 may determine a complexity of the corresponding sliced cross section correspond to a second level, e.g., normal. If that counted number of times is greater than the second threshold value, calculator 220 may determine a complexity of the corresponding sliced cross section correspond to a third level, e.g., high.

Calculator 220 may determine a total complexity of the 3D modeling data based on the complexities of the respective sliced cross sections. For example, calculator 220 may calculate an average number of times that sliced cross sections cross the lines and the vertexes and compare the average number of times with the first threshold value and the second threshold value. Then, calculator 220 may determine the total complexity as one of, e.g., the first level, the second level or the third level based on the comparison.

In determining complexity of each sliced cross section, calculator 220 may apply different weights to the number of times that a sliced cross section crosses with the lines that connect at least two vertexes, and the number of times that a sliced cross section crosses with the vertexes. For example, calculator 220 may determine that a sliced cross section crossing with the vertexes has higher complexity than a sliced cross section that crosses the lines that connect at least two vertexes.

Simulator 210 may be configured to change the preset thickness of the virtual simulation based on the complexity of each sliced cross section. For example, when it is determined as a result of analysis of complexity of each sliced cross section that output time and output quality can be improved by recalculating complexity of each slicing cross section by changing the preset thickness, the simulator 210 may change the preset thickness of the virtual simulation. In addition, simulator 210 may enable the simulation unit 120 to carry out the virtual simulation again with the changed thickness.

Slice thickness determination unit 230 may be configured to determine the slice thickness based on the complexity of each sliced cross section. For example, slice thickness determination unit 230 may determine the slice thickness based on the total complexity of the 3D modeling data. When the total complexity is a first level, e.g., low, slice thickness determination unit 230 may determine that a slicing thickness is set to be a first thickness, e.g., thick, and when the total complexity is a second level, e.g., normal, slice thickness determination unit 230 may determine that a slicing thickness is a second thickness, e.g., normal. When the total complexity is a third level, e.g., low, slice thickness determination unit 230 may determine that a slicing thickness is a third thickness, e.g., thin.

In another embodiment, slice thickness determination unit 230 may be configured to divide the 3D modeling data into a plurality of parts. For example, slice thickness determination unit 230 may group multiple sliced cross sections adjacent to each other and having the same complexity into one of the plurality of parts. Thus, a complexity of each of the parts may be determined.

In this case, slice thickness determination unit 230 may determine each slicing thickness of each of the parts, e.g., the first slicing thickness, the second slicing thickness or the slicing thickness depending on the respective complexity of each part, e.g., the first level, the second level or the third level.

The data slicer 240 may be configured to slice the 3D shape of the 3D modeling data based on the determined slice thickness. For example, data slicer 240 may slice the 3D modeling data into multiple layers in accordance with the determined slice thickness.

In another embodiment, data slicer 240 may slice each of the parts in accordance with the respectively determined slicing thickness.

G-code generator 250 may be configured to produce a G-code according to the slicing. For example, G-code generator 250 may generate data regarding movement of a nozzle including a printing direction and a printing area, data regarding printing property including material and color in accordance with respective layers. G-code generator 250 may generate the G-code based on the data regarding movement of a nozzle and the data regarding printing property. G-code generator 250 may generate a G-code based on the sliced 3D modeling data.

Transmitter 260 may transmit the G-code to the 3D printer 120.

Figure 3:
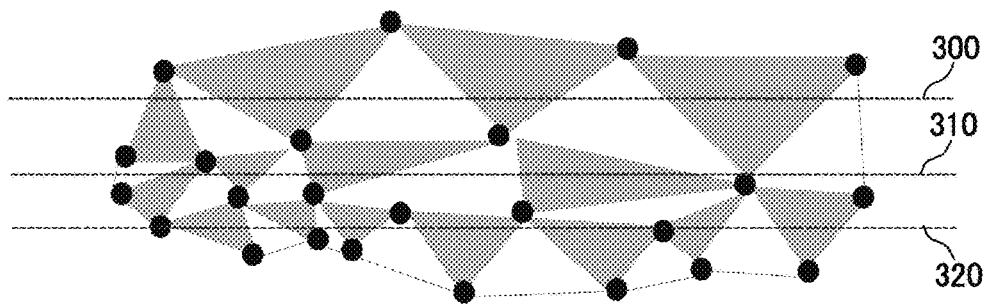
FIG. 3 is a depiction of sliced cross sections, in accordance with example embodiments of 3D modeling as described herein.

FIG. 3 is a depiction of sliced cross sections, in accordance with example embodiments of 3D modeling described herein.

As set forth above, variable slicer 100 may slice the 3D shape of the 3D modeling data with a preset thickness. Variable slicer 100 may determine a complexity of each sliced cross section. Variable slicer 100 may count the number of times that each sliced cross section crosses with vertexes of the 3D shape and/or crosses lines that connect two or more of the vertexes.

In the context of FIG. 3, variable slicer 100 may count the number of times that a first sliced cross section 300 crosses with lines connecting two or more vertexes of a 3D shape as well as the number of times that sliced cross section 300 crosses the vertexes thereof. In FIG. 3, the first sliced cross section 300 crosses the lines connecting at least two of the vertexes eight (8) times; and a second sliced cross section 310 crosses lines that connect at least two vertexes nine (9) times and crosses the vertexes one (1) time. A third sliced cross section 320 crosses lines connecting at least two vertexes eleven (11) times and crosses the vertexes twice.

Where the number of times that a slicing cross section crosses with the lines and the vertexes is large, the variable slicer 100 may determine that complexity of the corresponding slicing cross section is high, and where the number of times that a slicing cross section crosses with the lines and the vertexes is small, the variable slicer 100 may determine that complexity of the corresponding slicing cross section is low.

For example, based on the number of times that each of the first sliced cross section 300, the second sliced cross section 310, and the third sliced cross section 320 crosses the lines that connect at least two of the vertexes of the 3D shape and also cross the vertexes, calculator 220 may determine that complexities of the third sliced cross section 320, the second sliced cross section 310 and the first sliced cross section 300 increase in this order.

In determining complexity of each slicing cross section, variable slicer 100 may apply different weights to the number of times that a slicing cross section crosses with the lines, and the number of times that a slicing cross section crosses with the vertexes. For example, the variable slicer 100 may determine that a slicing cross section crossing with the vertexes has higher complexity than a slicing cross section crossing with the lines.

For example, calculator 220 may determine that the complexity of the third sliced cross section 320, which crosses with the lines connecting at least two of the vertexes of the 3D shape eleven (11) times and crosses the vertexes two (2) times, is far higher than that of the second sliced cross section 310, which crosses with the lines connecting two or more of the vertexes of the 3D shape nine (9) times and the vertexes one (1) time.

Figure 4:
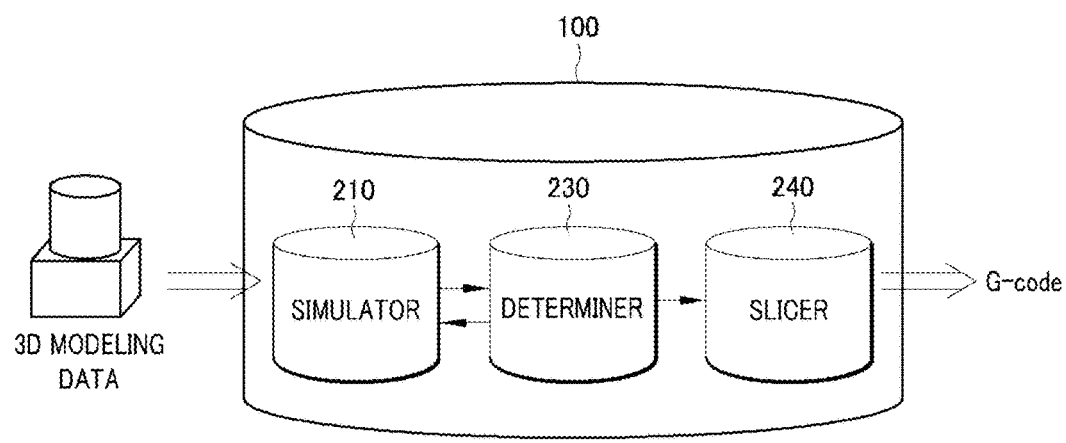
FIG. 4 illustrates a flow of data, in accordance with example embodiments of 3D modeling as described herein.

FIG. 4 illustrates a flow of data, in accordance with an example embodiment of 3D modeling described herein. Referring to FIGS. 1 and 2, variable slicer 100 may receive 3D modeling data from user terminal 110.

Simulator 210 may slice the received the 3D modeling data with a preset thickness.

Calculator (NOT shown in FIG. 4) may determine complexity of each sliced cross section. Calculator may count the number of times that each sliced cross section crosses lines connecting two or more of the vertexes of the 3D shape and/or crosses the vertexes.

In addition, calculator may change the preset thickness of the virtual simulation based on the complexity of each slicing cross section. For example, where it is determined as a result of analysis of complexity of each slicing cross section that output time and output quality can be improved by recalculating complexity of each slicing cross section by changing the preset thickness, the variable slicer 100 may change the preset thickness of the virtual simulation. In addition, the determiner 230 may enable the variable slicer 100 to carry out the virtual simulation again with the changed thickness.

In this case, simulator 210 may carry out the virtual simulation for the 3D modeling data with the changed thickness.

Data Slicer 240 may slice the 3D modeling data based on the changed slice thickness.

Transmitter 260 may produce a G-code according to the slicing and transmit the G-code to the 3D printer 120.

Figure 5:
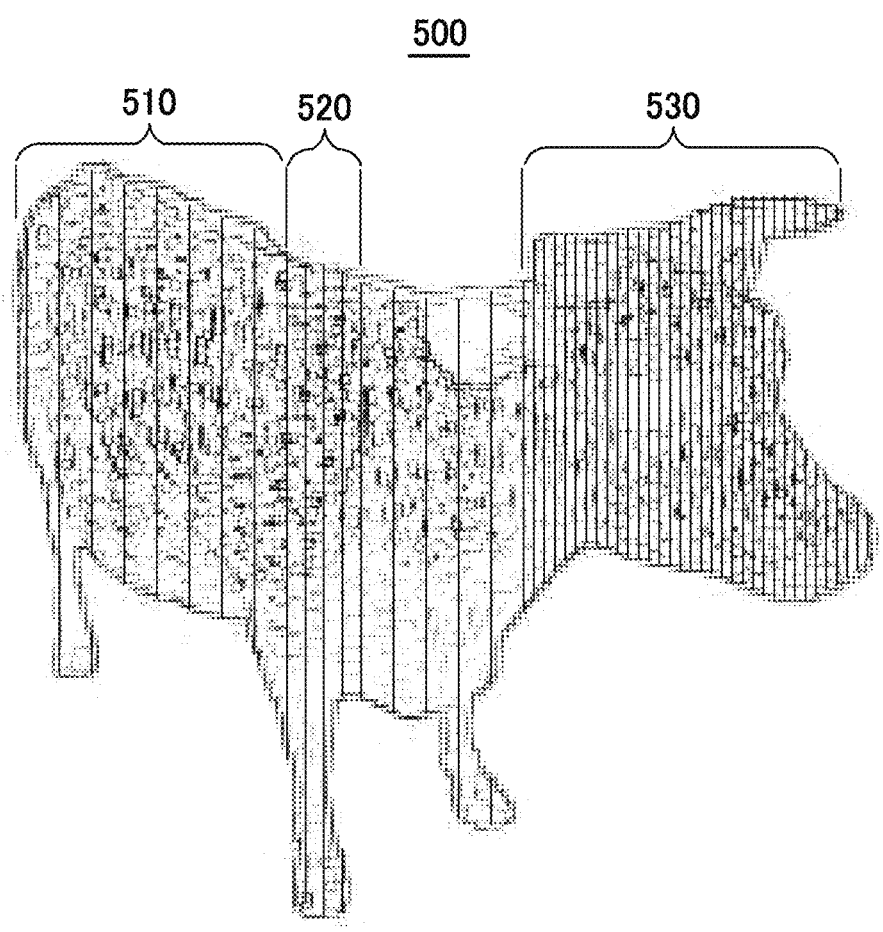
FIG. 5 shows an example of 3D modeling data adaptively sliced, in accordance with embodiments of 3D modeling as described herein.

FIG. 5 shows an example for the 3D modeling data sliced by the variable slicer. Referring to FIG. 5, variable slicer 100 may determine a complexity for each sliced cross section produced according to the virtual simulation result. Further, variable slicer 100 may determine a total complexity of the 3D modeling data based on the complexity of each of the sliced cross section crosses. Variable slicer 100 may divide 3D modeling data 500 of a calf into a plurality of parts, e.g., the backside part 510, the front leg part 520 and the head part 530 based on the complexity for each sliced cross section.

In that case, a complexity of the backside part 510 is a first level, that is, the complexity is low. A complexity of the front the leg part 520 is a second level, that is, the complexity is normal. A complexity of the front the head part 530 is a third level, that is, the complexity is high.

The variable slicer 100 may determine slicing thickness based on the complexity of each of the parts. For example, the variable slicer 100 may thinly slice the slicing cross section corresponding to the head part 530 of the calf shape, moderately slice the slicing cross section of the front leg part 520 of the calf shape, and thickly slice the slicing cross section of the backside part 510 of the calf shape.

Accordingly, the variable slicer 100 can increase an output speed of the 3D modeling data 500 of the calf and maintain the quality by changing the thickness of the slicing cross section of the 3D modeling data 500 of the calf, compared to the case of slicing the whole 3D modeling data 500 of the calf with the same thickness as that of the slicing cross section of the head part 530 of the calf shape in order to maintain the quality of the head part 530 of the calf shape.

Figure 6:
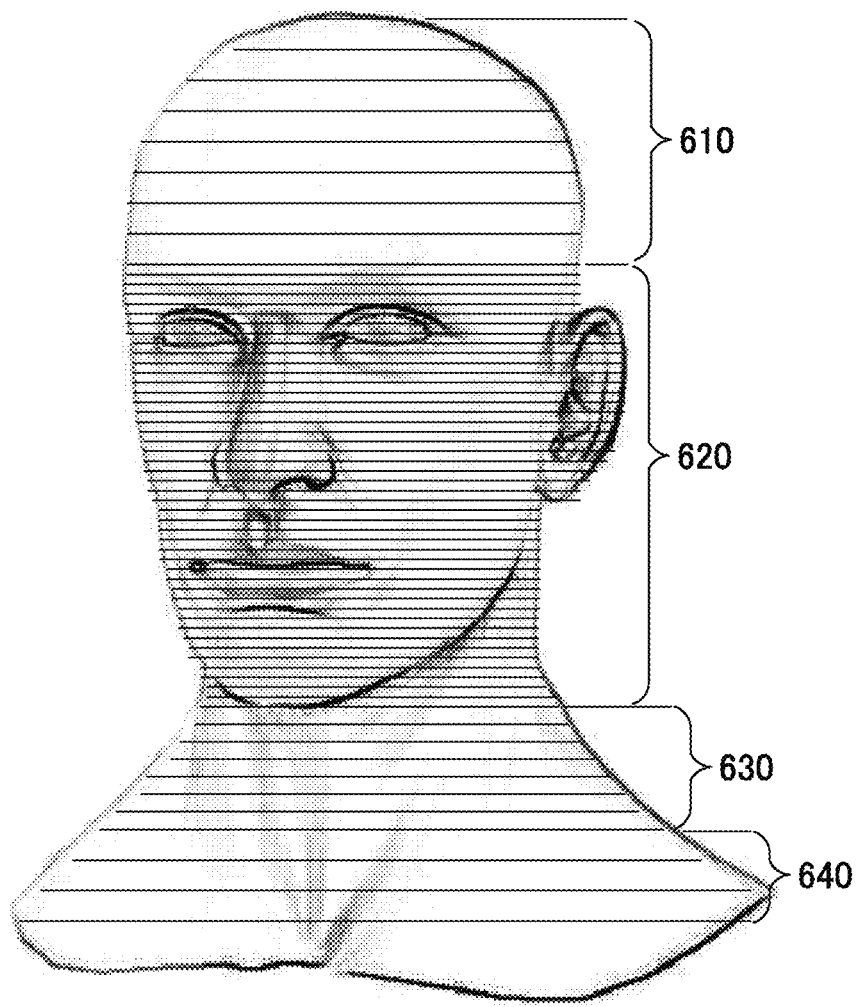
FIG. 6 shows another example of 3D modeling data adaptively sliced, in accordance with embodiments of 3D modeling as described herein.

FIG. 6 shows an example for other 3D modeling data adaptively sliced by the variable slicer. Referring to FIG. 6, Variable slicer 100 may determine a complexity for each sliced cross section produced according to the virtual simulation result. Further, variable slicer 100 may determine a total complexity of the 3D modeling data based on the complexity of each of the sliced cross section crosses. Variable slicer 100 may divide 3D modeling data 600 of the human being's upper body shape into a plurality of parts, e.g., the head part 610, the face part 620, the neck part 630 and the collarbone part 640 based on the complexity for each sliced cross section.

In that case, a complexity of the head part 610 and the collarbone part 640 is a first level, that is, the complexity is low. A complexity of the neck part 630 is a second level, that is, the complexity is normal. A complexity of the face part 620 is a third level, that is, the complexity is high.

The variable slicer 100 may determine slicing thickness based on the complexity of each of the parts. For example, the variable slicer 100 may make the thicknesses of the slicing cross sections for the head part 610 and the collarbone part 640, the neck part 630 and the face part 620 decreased in this order.

Figure 7:
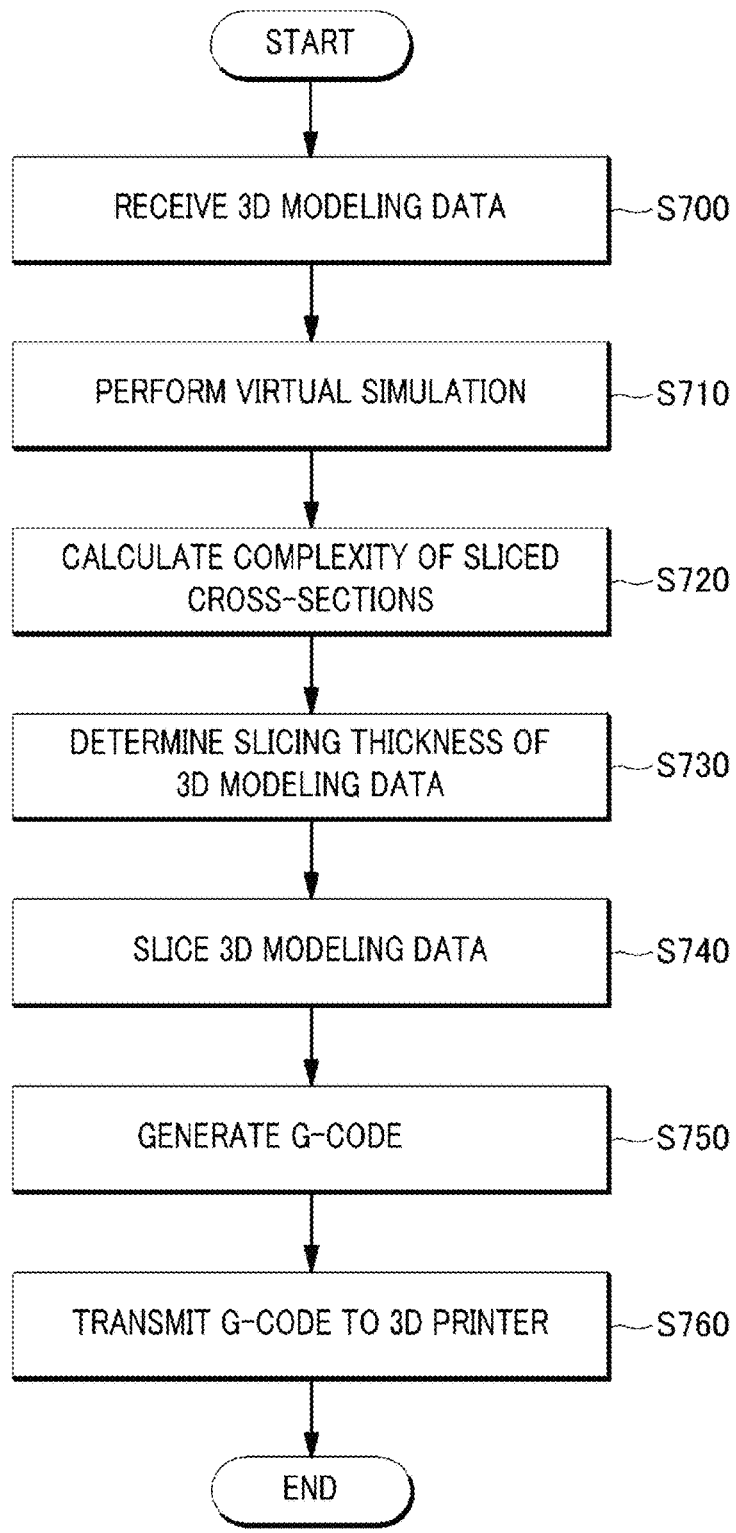
FIG. 7 is a flow diagram showing a variable slicing method, in accordance with example embodiments of 3D modeling as described herein.

FIG. 7 is a flow chart showing a variable slicing method in accordance with an example embodiment. The variable slicing method illustrated in FIG. 7 in accordance with an example embodiment includes the steps sequentially carried out in the system illustrated in FIG. 1. According to the description of the operations in FIG. 7, any of the operations depicted and described herein may be implemented as computer-readable instructions stored on a computer-readable medium. The computer-readable instructions may, for example, be executed by a processor of any of devices 110 and 120, as referenced herein, having a network element and/or any other device corresponding thereto, particularly as applicable to the applications and/or programs described above. The example process may include one or more operations, actions, or functions as illustrated by one or more blocks S700, S710, S720, S730, S740, S750, and S760. Although illustrated as discrete blocks, various blocks may be divided into additional blocks, combined into fewer blocks, or eliminated, depending on the desired implementation. Processing may begin at S700.

S700 (Receive 3D Modeling Data) may refer to variable slicer 100 receiving 3D modeling data from user terminal 110. Processing may proceed to S710.

S710 (Perform Virtual Simulation) may refer to variable slicer 100 performing a virtual simulation to slice the 3D shape of the received 3D modeling data with a preset thickness. Processing may proceed to S720.

S720 (Calculate Complexity of Sliced Cross-Sections) may refer to calculator 220 determining complexity of each slicing cross section produced according to the virtual simulation result. Processing may proceed to S730.

S730 (Determine Slicing Thickness of 3D Modeling Data) may refer to simulator 210 adaptively changing a slice thickness based on the complexity of each slicing cross section. Processing may proceed to S740.

S740 (Slice 3D Modeling Data) may refer to data slicer 240 slicing the 3D shape of the 3D modeling data based on the changed slice thickness. Processing may proceed to S750.

S750 (Generate G-Code) may refer to G-code generator 250 producing a G-code according to sliced 3D modeling data in the changed slice thickness. Processing may proceed to S760.

S760 (Transmit G-Code to 3D Printer) may refer to transmitter 260 transmitting the produced G-code to the 3D printer.

Figure 8:
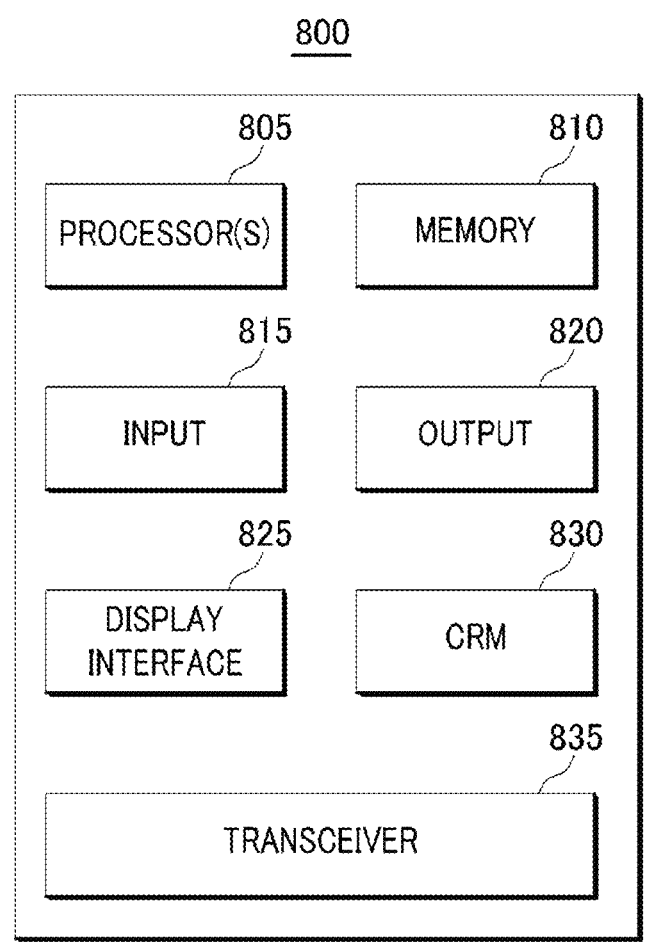
FIG. 8 shows an example computing device on which and by which at least portions of thumbnail may be implemented, arranged in accordance with one or more embodiments described herein.

FIG. 8 shows an example computing device on which and by which at least portions of thumbnail may be implemented, arranged in accordance with one or more embodiments described herein.

FIG. 8 shows an illustrative computing embodiment, in which any of the processes and sub-processes 3D modeling, including variable slicing, may be implemented as computer-readable instructions stored on a computer-readable medium. The computer-readable instructions may, for example, be executed by a processor of variable slicer 110, as referenced herein, having a network element and/or any other device corresponding thereto, particularly as applicable to the applications and/or programs described above corresponding to the configuration for 3D modeling and variable slicing.

In a very basic configuration, a computing device 800 may typically include, at least, one or more processors 805 and a system memory 810. Computing device 800 may also include one or more input components 815, one or more output components 820, a display component 825, a computer-readable medium 830, and a transceiver 835.

Processor(s) 805 may refer to, e.g., a microprocessor, a microcontroller, a digital signal processor, or any combination thereof.

Memory 810 may refer to, e.g., a volatile memory, non-volatile memory, or any combination thereof. Memory 810 may store, therein, an operating system, an application, and/or program data. That is, memory 810 may store executable instructions to implement any of the functions or operations described above and, therefore, memory 810 may be regarded as a computer-readable medium.

Input component 815 may refer to a built-in or communicatively coupled keyboard, touch screen, or telecommunication device. Further, an input component, if not built-in to computing device 800, may be communicatively coupled thereto via short-range communication protocols including, but not limited to, radio frequency or Bluetooth.

Output component 820 may refer to a component or module, which may be built-in or removable from computing device 800, which is configured to output data to an external device.

Display component 825 may refer to, e.g., a solid state display that may have touch input capabilities. That is, a display component may include capabilities that may be shared with or replace those of the aforementioned input components.

Computer-readable medium 830 may refer to a separable machine readable medium that is configured to store one or more programs that embody any of the functions or operations described above. That is, a computer-readable medium, which may be received into or otherwise connected to a drive component of computing device 800, may store executable instructions to implement any of the functions or operations described above. These instructions may be complimentary or otherwise independent of those stored by memory 810.

Transceiver 835 may refer to a network communication link for computing device 800, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method of varying a slicing thickness for 3D modeling, comprising:
   receiving 3D modeling data from a user device;
   carrying out a virtual simulation to virtually slice the 3D modeling data, in accordance with a first thickness, into multiple cross-sections, the 3D modeling data being sliced virtually such that each of the multiple cross-sections has the same thickness;
   calculating a complexity of one or more of the multiple cross-sections produced according to the result of the virtual simulation;
   determining a slicing thickness of the 3D modeling data based on the complexity of the one or more of the multiple cross-sections;
   slicing the 3D modeling data in the determined slicing thickness;
   generating a G-code based on the sliced 3D modeling data; and
   transmitting the G-code to a 3D printer,
   wherein the determining includes:
      dividing the 3D modeling data into a plurality of parts based on the complexity of the one or more of the multiple cross-sections produced according to the result of the virtual simulation,
      calculating a respective complexity of each of the plurality of parts, and
      determining a respective slicing thickness of each of the plurality of parts based on the respective complexity of each of the plurality of parts, and
   wherein the slicing includes slicing each of the plurality of parts in accordance with the respective determined slicing thickness, and
   wherein the calculating of the complexity of the one or more of the multiple cross-sections comprises:
      counting at least one of a number of vertexes or a number of lines that intersect with the one or more of the multiple cross-sections; and calculating the complexity of the one or more of the multiple cross-sections based on at least one of the counted number of vertexes or the counted number of lines.

2. The method of claim 1, further comprising:
changing the first thickness to a second thickness; and
slicing the 3D modeling data in accordance with the second thickness.

3. The method of claim 1, wherein the slicing utilizes a 3D polygon mesh model that is formed based on the 3D modeling data.

4. The method of claim 1, wherein the calculating includes:
assigning a first weight to the counted number of vertexes and assigning a second weight to the counted number of lines, and
calculating the complexity of the sliced cross-sections based on the first weight and the second weight.

5. The method of claim 1, wherein the determined complexity of the one or more of the multiple cross-sections is proportional to at least one of the counted number of vertexes or the counted number of lines.

6. The method of claim 1, wherein the slicing thickness of the 3D modeling data is determined to be inversely proportional to the complexity of the one or more of the multiple cross-sections.

7. The method of claim 1, further comprising:
generating a G-code for each sliced part; and
transmitting each G-code to the 3D printer.

8. A 3D modeling device, comprising:
a receiver configured to receive 3D modeling data from a user device;
a simulator configured to carry out a virtual simulation to virtually slice the 3D modeling data in, accordance with a first thickness, into multiple cross-sections, the 3D modeling data being sliced virtually such that each of the multiple cross-sections has the same thickness;
a calculator configured to calculate a complexity of one or more of the multiple cross-sections produced according to the result of the virtual simulation;
a slice thickness determination unit configured to determine a slicing thickness of the 3D modeling data based on the complexity of the sliced cross-sections;
a data slicer configured to slice the 3D modeling data in accordance with the determined thickness;
a G-code generator configured to generate a G-code based on the sliced 3D modeling data; and
a transmitter configured to transmit the G-code to a 3D printer,
wherein the slice thickness determination unit is further configured to divide the 3D modeling data into a plurality of parts based on the complexity of the one or more of the multiple cross-sections produced according to the result of the virtual simulation,
wherein the calculator is further configured to calculate a respective complexity of each of the plurality of parts,
wherein the slice thickness determination unit is further configured to determine a respective slicing thickness of each of the plurality of parts based on the respective complexity of each of the plurality of parts,
wherein the data slicer is further configured to slice each of the plurality of parts in accordance with the respective determined slicing thickness, and
wherein the calculator is further configured to:
count at least one of a number of vertexes or a number of lines that intersect with the one or more of the multiple cross-sections; and
calculate the complexity of the one or more of the multiple cross-sections based on at least one of the counted number of vertexes or the counted number of lines.

9. The device of claim 8, wherein the simulator is further configured to:
change the first thickness to a second thickness, and
slice the 3D modeling data in accordance with the second thickness.

10. The device of claim 8, wherein the calculator is configured to determine the complexity of the one or more of the multiple cross-sections by:
assigning a first weight to the counted number of vertexes;
assigning a second weight to the counted number of lines; and
calculating the complexity of the one or more of the multiple cross-sections based on the first weight and the second weight.

11. The device of claim 8, wherein the determined complexity of the one or more of the multiple cross-sections is proportional to at least one of the counted number of vertexes or the counted number of lines.

12. The device of claim 8, wherein the slicing thickness of the 3D modeling data is determined to be inversely proportional to the complexity of the one or more of the multiple cross-sections.

13. The device of claim 8, wherein:
the G-code generator is further configured to generate a G-code based on each sliced part, and
the transmitter is further configured to transmit each G-code to the 3D printer.

14. A computing device, comprising:
a memory; and
a processing unit configured to:
receive 3D modeling data from a user device,
carry out a virtual simulation to virtually slice the 3D modeling data, in accordance with a first thickness, into multiple cross-sections, the 3D modeling data being sliced virtually such that each of the multiple cross-sections has the same thickness,
calculate a complexity of one or more of the multiple cross-sections produced according to the result of the virtual simulation,
determine a slicing thickness of the 3D modeling data based on the complexity of the one or more of the cross-sections,
slice the 3D modeling data in the determined slicing thickness;
generate a G-code based on the sliced 3D modeling data; and
transmit the G-code to a 3D printer,
wherein the processing unit is further configured to:
divide the 3D modeling data into a plurality of parts based on the complexity of the one or more of the multiple cross-sections produced according to the result of the virtual simulation,
calculate a respective complexity of each of the plurality of parts,
determine a respective slicing thickness of each of the plurality of parts based on the respective complexity of each of the plurality of parts,
slice each of the plurality of parts in accordance with the respective determined slicing thickness, and
wherein the processing unit is further configured to:
count at least one of a number of vertexes or a number of lines that intersect with the one or more of the multiple cross-sections; and calculate the complexity of the one or more of the multiple cross-sections based on at least one of the counted number of vertexes or the counted number of lines.

\* \* \* \* \*